INVENTORS
CHARLES H. NAUNDORF
JOHN T. PAVEL
BY
Bernard A. Chiama
ATTORNEY

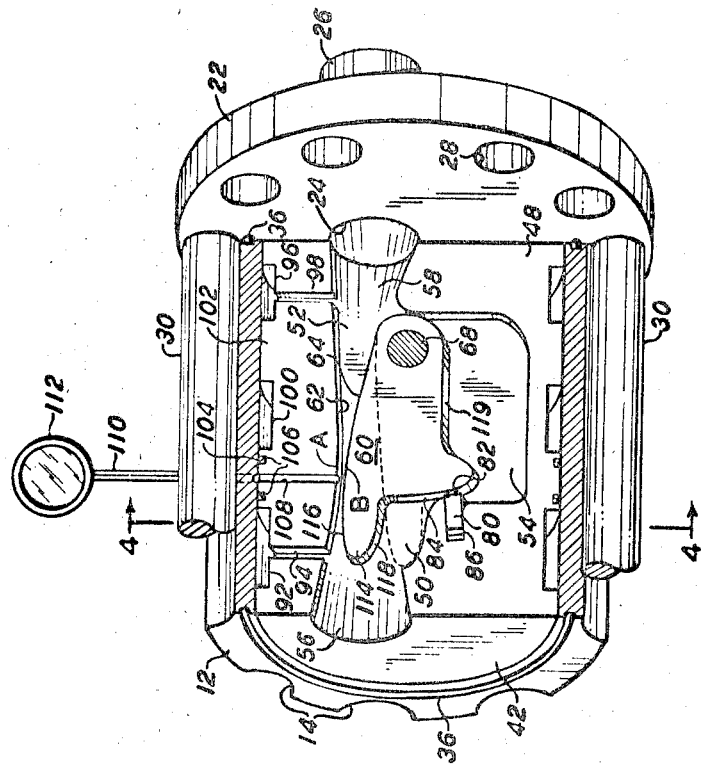

April 16, 1968   C. H. NAUNDORF ET AL   3,378,226
HIGH PRESSURE FLUID FLOW MEASUREMENT AND/OR CONTROL
Filed Nov. 13, 1963   3 Sheets-Sheet 3

INVENTORS
CHARLES H. NAUNDORF
JOHN T. PAVEL
BY
*Bernard A. Chiama*
ATTORNEY

United States Patent Office 3,378,226
Patented Apr. 16, 1968

3,378,226
HIGH PRESSURE FLUID FLOW MEASUREMENT
AND/OR CONTROL
Charles H. Naundorf, Rochester, N.Y. (2911 Stanwin Place, Cincinnati, Ohio 45241), and John T. Pavel, 292 Norcrest Drive, Rochester, N.Y. 14617
Filed Nov. 13, 1963, Ser. No. 323,367
2 Claims. (Cl. 251—298)

This invention relates to valves, and more particularly to a valve which is specifically adapted for metering and/or controlling gases or liquids at extremely high pressures with proportional actuation thereof.

An object of the present invention provides a valve structure which will withstand extremely high pressures on the order of 30,000 p.s.i. and greater.

Another object of the invention is to provide a valve having control structure to permit linear fluid flow proportional to linear actuation of the valve.

Still another object of the invention to to provide a measuring device which permits the measurement of fluid flow as a product of easily measured parameters.

Other objects and advantages of the present invention will become apparent from the following description taken in conjunction with the accompanying drawings wherein:

FIG. 3 is a fragmentary perspective view partly in section of the valve element and holding blocks therefor of the present invention;

FIG. 4 is a section taken along line 4—4 of FIG. 1;

Figure 2:
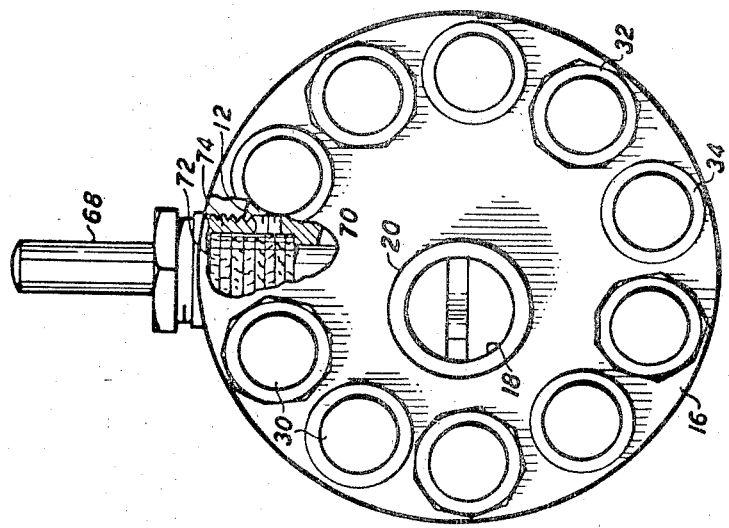
FIG. 2 is an end view of the inlet side of the valve of FIG. 1.
Figure 1:
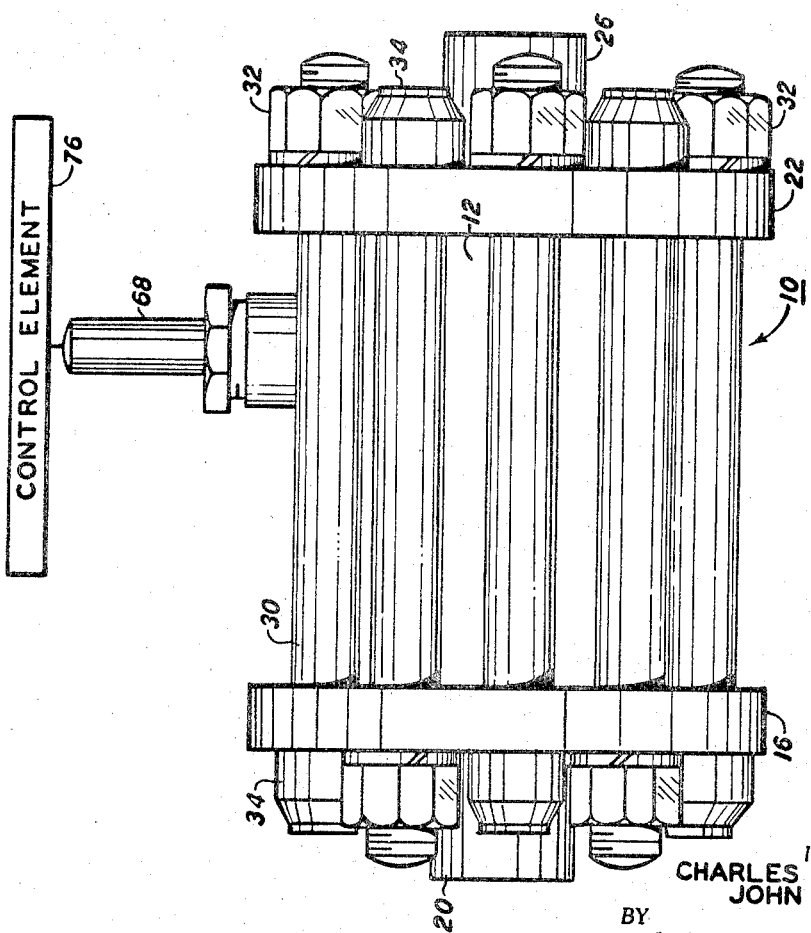
FIG. 1 is a plan view of the valve of the present invention.

Referring now to the drawing, and particularly FIGS. 1 and 2, there is shown a valve having a valve body generally indicated by the reference numeral 10. The valve body comprises a hollow cylindrical element 12 formed with a plurality of longitudinally extending and circumferentially spaced grooves 14. At one end of the cylindrical element 12 there is provided a circular plate 16 formed with an inlet opening 18 for a valve and a cylindrical inlet nipple 20 secured to the plate 16 and surrounding the opening 18. A suitable piping connection or fitting from a source of fluid under high pressure (not shown) may be connected to the nipple 20.

The other end of the cylindrical element 12 is also closed off by a circular plate 22 formed with an outlet opening 24 for the valve and has secured thereto a cylindrical outlet nipple 26 surrounding the opening 24. A piping or fitting (not shown) may be connected to the nipple 26 for conducting fluid that has passed through the valve into the fluid system to which the valve may be a part.

Each of the end plates 16, 22 is formed with a plurality of openings 28 through which a number of retaining bolts 30 may be passed when the plates 16, 22 are positioned against the ends of the cylindrical element 12. The bolts 30 are positioned within the grooves 14 of the element 12 and are maintained tightly therein and against the outside faces of the plates 16, 22 by suitable nuts and bolt heads 32, 34. The number of bolts, the diameters thereof and the thickness of the walls of the cylindrical element 12 will be determined by the amount of fluid pressure the valve body is designed to experience. Suitable O rings 36 are maintained within appropriate grooves formed at each end of the cylindrical element 12 and serve to prevent leakage of high pressure fluid between the ends of the element 12 and the co-acting end plates 16, 22.

Within the element 12 and retained by the inner wall thereof is a cylindrical member 38 of generally solid construction. The outside cylindrical surface of the member 38 has a diameter equal to the diameter of the inner wall of the element 12 and the length of the member is equal to the length of the element.

The member 38 comprises two blocks 40, 42 split along the length of the member on a line parallel to and slightly offset from a diameter of the member 38. In FIG. 4, this line of division between the blocks 40, 42 is shown at 44. The block 40 is formed with a flat surface 46 extending the length thereof and contiguous with the division line 44. This surface is opposed to and maintained against a corresponding surface 48 formed on the block 42 along the length thereof. The surfaces 46 and 48 are ground flat, and when held together within the cylindrical element 12, face each other in fluid-tight relationship.

The block 42 has a recess 50 formed therein along the central portion of the surface 48, which recess is divided into a valve chamber 52 and a lower chamber 54. The valve chamber is in communication with an entry port 56 formed at one end of the joined blocks 40, 42 and an exit port 58 formed at the other end of the joined blocks. When mounted within the cylinder 12 and between the end plates 16, 22, the entry port 56 is in alignment with the inlet 20, and the exit port is in alignment with the outlet 26.

Rotatably retained within the valve chamber 52 is a valve element 60 in the form of a flat-sided plate. The upper end of the valve chamber is bounded by a narrow wall 62 which is aerodynamically contoured and has a width approximately equal to the width of the valve element 60. The upper edge wall 64 of the valve element, opposite the contoured wall 62 is also aerodynamically contoured. For optimum result, the walls 62, 64 are formed nearly identical and are arranged relative to each other so that the two walls form a Venturi passage for fluid flow for any position of the valve element.

The valve chamber 52 is also bounded by a flat wall 66 which, when the two blocks 40, 42 are mounted together, as shown in FIG. 4, is parallel to the surface 46 of the block 40. In this normal position of the blocks, the walls 46 and 66 are parallel to each other and to the side walls of the valve element 60. For maintaining leakage of fluid passing through the valve chamber 52 to a minimum, the surfaces of the walls 46 and 66 and the cooperating side walls of the valve element are ground to a high degree of polish and are maintained in very close relationship.

Rotative movement of the valve element 60 is provided by a shaft 68 which is secured to the valve element. The shaft is rotatably retained at one end in the block 42 and has its other end projecting through the block 40, through aperture 70 formed in the cylinder 12 and between two adjacent mounting bolts 30. As shown in FIG. 2, suitable packing 72 and a packing thimble and nut 74 surround the shaft and serve to rotatably support the shaft and to prevent leakage of fluid from the valve chamber at this point. A suitable control apparatus 76 such as a manually operable handle or an automatic controller device may be connected to the outer end of the shaft for effecting rotation of the valve element 60.

It will be apparent that the valve element 60 separates the lower chamber 54 from the valve chamber 52. The lower chamber serves to receive the valve element when the same has been rotated downwardly for increasing the distance between the walls 62 and 64. In order to prevent fluid under high pressure in the chamber 52 adjacent the entry port 56 from entering the chamber 54 during actuation of the valve element 60, a sealing device is provided which comprises a member 80 having sealing material 82 at one end thereof in continuous engagement with the lower curved edge 84 of the valve element 60 for any movement thereof. The member 80 is received in an opening 86 formed in the block 42.

As shown in FIG. 3, the curved edge 84 has its radius of curvature coincident with the axis of the shaft 68. With this arrangement, there is a minimum of interference in the actuation of the valve element 60 by the member 80. In addition, the force exerted upon the element by the member 80 will be equal for all positions of the valve element.

Preferably the sealing material 82 is made from a metal softer than the metal that comprises the valve element 60. Any wear upon these parts will occur only in the sealing material which, as it wears will be continually forced against the valve element. From the foregoing, it will be apparent that the sealing device will prevent fluid from flowing below the valve element 60 into the chamber 54. This will result in confining the fluid that enters the entry port 56 to the valve chamber 52 and to insure that fluid flow through this chamber is controlled only by means of the positioning of the edge 64 relative to the edge 62.

The present invention is adaptable for all pressures and is particularly adapted for controlling extremely high pressures, say on the order of 3,000 to 30,000 p.s.i. or greater. In order to attain these pressures with a minimum of relatively large structural parts for confining the valve chamber 52, the outer surfaces of the blocks 40, 42 are provided with a first circumferential groove 92, into which high pressure from the inlet port 56 is introduced by way of passageway 94 and a second circumferential groove 96 which experiences low pressure from the valve chamber 52 by way of a passageway 98. A third groove 100 is also formed in the blocks 40, 42 between the grooves 92, 96 in order to increase the area exposed to the pressure from the groove 96, the passageway 98, and the chamber 52. The grooves 96 and 100 are in communication with each other in view of the spacing that exists between the land 102 and the adjacent internal surface of the cylinder 12. Since the groove 92 receives pressure from a different source and, in order to prevent leakage around the valve element by way of the grooves, sealing devices 104 are utilized in the land 106 between the grooves 92 and 100.

With the groove 92 experiencing the high pressure input to the valve 10 and the grooves 96, 100 experiencing the pressure downstream of the valve element, the corresponding high pressures are exerted against the inner surface of the cylinder 12. This distribution of the pressures brings into play the full internal peripheral forces that the cylinder is capable of producing in its ability to resist radial deformation. Without these grooves, the extreme high pressures within the valve chamber will tend to force the blocks 40, 42 apart, or to deflect, thereby localizing the resultant stress against the cylinder portions adjacent the plane 44.

As the fluid progresses through the valve chamber 52, the smallest area between the edge surfaces 62, 64 at points A and B respectively, becomes more confining and the velocity increases. The pressure decreases accordingly and becomes minimal at the points A and B where edge surfaces 62, 64 are closest to each other. As the fluid passes through the valve chamber 52, the velocity diminishes and the pressure rises. Since passageways 94 and 98 are connected to the relatively higher pressure points along the edge surface 62, the total force inward on blocks 40 and 42 is greater than the total force outward on these blocks due to the pressure in the valve chamber 52. This greater inward force assures the non-bowing or deflection of blocks 40 and 42, hence assuring consistent flow through the valve chamber.

In order to permit measurement or recording of the pressure within the valve body, a passageway 108 is formed in the block 42 between the edge surface 62 and the land 106 and extends through the cylinder wall 12. A tube 110 externally connects the passageway to a suitable high pressure gauge 112 or a transducer for read out or control purposes.

In operation, the valve body 10 may be connected into a fluid line to control its rate of flow. The fluid will pass into the inlet port 56, through the valve chamber 52 as defined by the edge surfaces 62, 64 and the side surfaces 46, 66, and out the outlet port 58. Control of the fluid flow is accomplished by rotation of the shaft 68 which, in turn, moves the valve element 60 along an accurate path having its center of curvature coincident with the axis of the shaft. In this manner, the valve element 60 may be moved from a closed position wherein the edge surfaces 62, 64 are in abutment or to a fully open position wherein the edge surface is positioned as shown by the dotted line 64a, or to any other position between the two illustrated positions.

Since the fixed edge surface 62 and the movable edge surface 64a are aerodynamically contoured and since these edge surfaces are flat and parallel to each other, any opening therebetween caused by the rotation of the shaft 68 will be rectangular in cross-section. Any resultant rectangle thus formed, say between points A and B, will have a fixed dimension in one direction, as defined by the walls 46, 66 and a variable dimension in another direction as defined by the edge walls 62, 64. With this configuration movement of the edge wall 64 will cause linear variations in the size of the rectangle. From this, then it will be apparent that rotation of the control shaft 68 will produce a linear variation in the size of the rectangle and, consequently, linear control of the fluid flow through the valve body.

As shown in FIG. 3, the valve element 60 is provided with a tongue portion 114 having an upper surface 116 which forms part of the edge wall 64 and is aerodynamically contoured therewith. The lower edge wall 118 of the tongue provides a surface which will experience the pressure within the inlet port 56.

Similarly, the lower edge surface 119 of the valve element 60 will experience the pressure downstream of the valve beyond points A–B. With this arrangement the summation of forces downward upon the edge surfaces 116 and 64 will be equal and opposite to the summation of upward forces exerted on the edge surfaces 118 and 119.

It will be apparent then that these equalized pressure distributions on the valve element will enhance the stability of operation of the valve. As a direct result of this balance of forces produced by various pressures within the valve, movement of the valve element for control purposes will require only a minimum of torque, and this, to overcome the inertia of and friction between the moving parts. The balancing of pressure forces also results in a stabilized valve element which will maintain any position to which it is moved without the use of appreciable holding forces.

Figure 5:
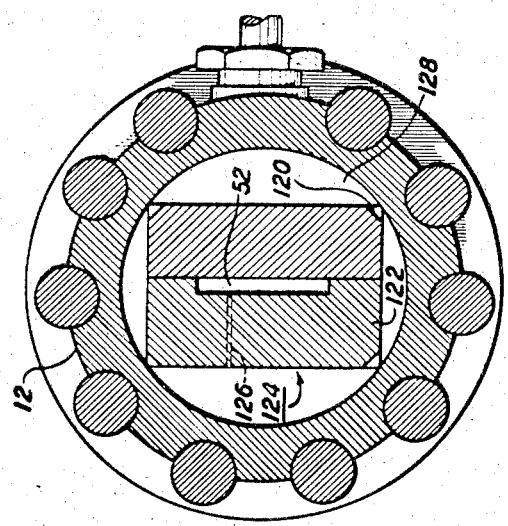
FIG. 5 is a sectional view of another embodiment of a detail of the present invention.

In the embodiment of FIG. 5, the cylinder 12 is shown as containing valve blocks 120, 122, which replace blocks 40, 42 respectively and, in all other respects, the embodiment of FIG. 5 is similar to the embodiment of FIG. 1. The blocks 120, 122 when combined, as shown in FIG. 5, present a member 124 having a rectangular cross-section. The dimensions of the member 124 are such that the corners 125 make contact with the interior surface of the cylinder 12 to be retained thereby. A passageway 126, similar to passageways 94 and 98, is formed in the block 122 for allowing the fluid pressure within the valve chamber 52 to reach the spacing 128 between the outside surfaces of the member 124 and the interior surface of the cylinder 12.

Figure 6:
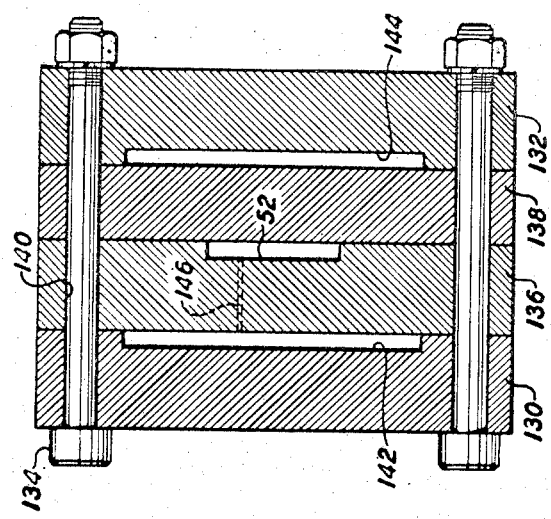
FIG. 6 is a sectional view of still another embodiment of the detail shown in FIG. 5.

In the embodiment of FIG. 6, the cylinder which encapsules the valve blocks of the embodiments of FIGS. 1 and 5 has been replaced by retaining plates 130, 132. The plates are retained in a parallel relationship by a plurality of bolts 134 mounted along each edge of these plates and, preferably, the valve blocks, here indicated at 136, 138, are formed with complementary openings 140 for receiving the bolts therethrough. Spacings 142, 144 are provided between the blocks 136, 138 and their respective retaining plate. A passageway 146 formed in the block 136 and a similar passageway formed in the block 138 permits communication between the valve chamber 52 and the spacings 142, 144 in order to expose the sides of the blocks 136, 138 adjacent to their respective spacing with the pressure that is present in the valve chamber.

The spacing 128 of FIG. 5 performs the same function as grooves 92, 96 and 100 of FIG. 3, with regard to the pressure distribution on the outside of the valve blocks relative to the cylinders which encompass the blocks. In both cases, the pressures within the spacings exert a force to hold the blocks together, and this force is such as to compensate for the force in the valve chamber which tends to move the blocks apart and to bend the blocks at their weakest point when the valves are subjected to extremely high pressures. To maintain the high pressures in the spacings, the elements 12, being cylindrical in form, provide a structure which will distribute the forces developed by high pressure within the spacings to a surface having a minimum of area. In addition, since the elements 12 are cylindrical, the effect of the forces on the internal surfaces thereof will be resisted evenly by the material of the elements along the circumference. With this arrangement, there is no tendency for the elements to deflect or bend or tear at any one point.

In the embodiment of FIG. 6, the retaining plates 130, 132 are rectangular as distinguished from the cylindrical elements 12; however, the forces produced by high pressures within the spacings 142, 144 and which affect the inner surfaces of the plates are evenly distributed against the entire affected surfaces. Any tendency for the blocks 136, 138 to bend along a line extending through the valve chamber 52 will be resisted by nearly all of the material of the plates 130, 132 rather than at some point along the bending line of the blocks.

Each of the embodiments of the invention may be utilized for the measurement of flow by simple computation of easily attained parameters. As an example, referring to the embodiment of FIGS. 1–4, flow can be determined as the product of the pressure upstream of the inlet port 56, the pressure in passageway 108, and the area of the valve chamber defined by the edge surfaces 62, 64 and adjoining sides 44, 46.

From the foregoing it will be apparent that the present invention is particularly adapted for control purposes of extremely high pressures. In addition the invention may be useful as a meter for the flow of fluids. Since many changes could be made in the invention and many apparently widely different embodiments devised without departing from the scope of the invention, it is intended that all matter contained in the drawings shall be interpreted as illustrative and not in a limiting sense.

We claim:

1. A valve structure comprising a valve body having first member and second members in abutting relationship and a retaining element surrounding said members for maintaining the same in close abutment, said element and said members being spaced from each other to define a spacing therebetween, said spacing extending over a substantial area of said element and said members, one of said members having the side thereof facing said other member formed with a valve chamber defined by a straight side wall, said area in each said member being opposed to said valve chamber and at least as great in area as said valve chamber, a fixed end wall having a curved surface extending into the chamber and a movable end wall opposed to said fixed end wall and being formed with a curved surface extending into the chamber toward said curved surface of said fixed end wall, the other of said members having a side thereof closing said chamber when said members are in abutting relationship, said valve body having an inlet and an outlet in communication with said valve chamber and arranged with said curved surfaces therebetween, means connected to said movable end wall for moving the same toward and away from said fixed wall for controlling the flow of fluid through said valve chamber and, means communicating between said spacing and said valve chamber for exposing the spacing to the pressure within the valve chamber.

2. A valve structure comprising a valve body having first member and second members in abutting relationship and retaining plates positioned one on either side of said members for maintaining the same in close abutment, each of said plates and its respective member being spaced to define a spacing therebetween, one of said members having the side thereof facing said other member formed with a valve chamber defined by a straight side wall, a fixed end wall having a curved surface extending into the chamber and a movable end wall opposed to said fixed end wall and being formed with a curved surface extending into the chamber toward said curved surface of said fixed end wall, the other of said members having a side thereof closing said chamber when said members are in abutting relationship, said valve body having an inlet and an outlet in communication with said valve chamber and arranged with said curved surfaces therebetween, means connected to said movable end wall for moving the same toward and away from said valve chamber and, means communicating between said spacings and the valve chamber for introducing pressure within said spacings for producing forces against said members in opposition to the forces produced by the fluid in the valve chamber.

References Cited
UNITED STATES PATENTS

| | | | |
|---|---|---|---|
| 1,095,767 | 5/1914 | Adams | 138—46 |
| 1,507,828 | 9/1924 | Harper | 251—283 |
| 2,531,896 | 11/1950 | Telbizoff | 138—46 |
| 2,562,202 | 7/1951 | Metsger | 138—46 |
| 2,591,429 | 4/1952 | Harrower | 137—340 |
| 2,614,790 | 10/1952 | Laskowitz | 251—283 X |

FOREIGN PATENTS 646,438  8/1962  Canada.

M. CARY NELSON, Primary Examiner.

HENRY T. KLINKSIEK, Assistant Examiner.